SEMI-CONDUCTOR DEVICE

Filed July 28, 1955

INVENTOR.
Edward G. Roka

BY R. E. Fowler

ATTORNEY

United States Patent Office 3,177,413

Patented Apr. 6, 1965

3,177,413

SEMI-CONDUCTOR DEVICE

Edward G. Roka, Indianapolis, Ind., assignor to General Motors Corporation, Detroit, Mich., a corporation of Delaware Filed July 28, 1955, Ser. No. 525,010
3 Claims. (Cl. 317—234)

Figures 1, 2, 3:
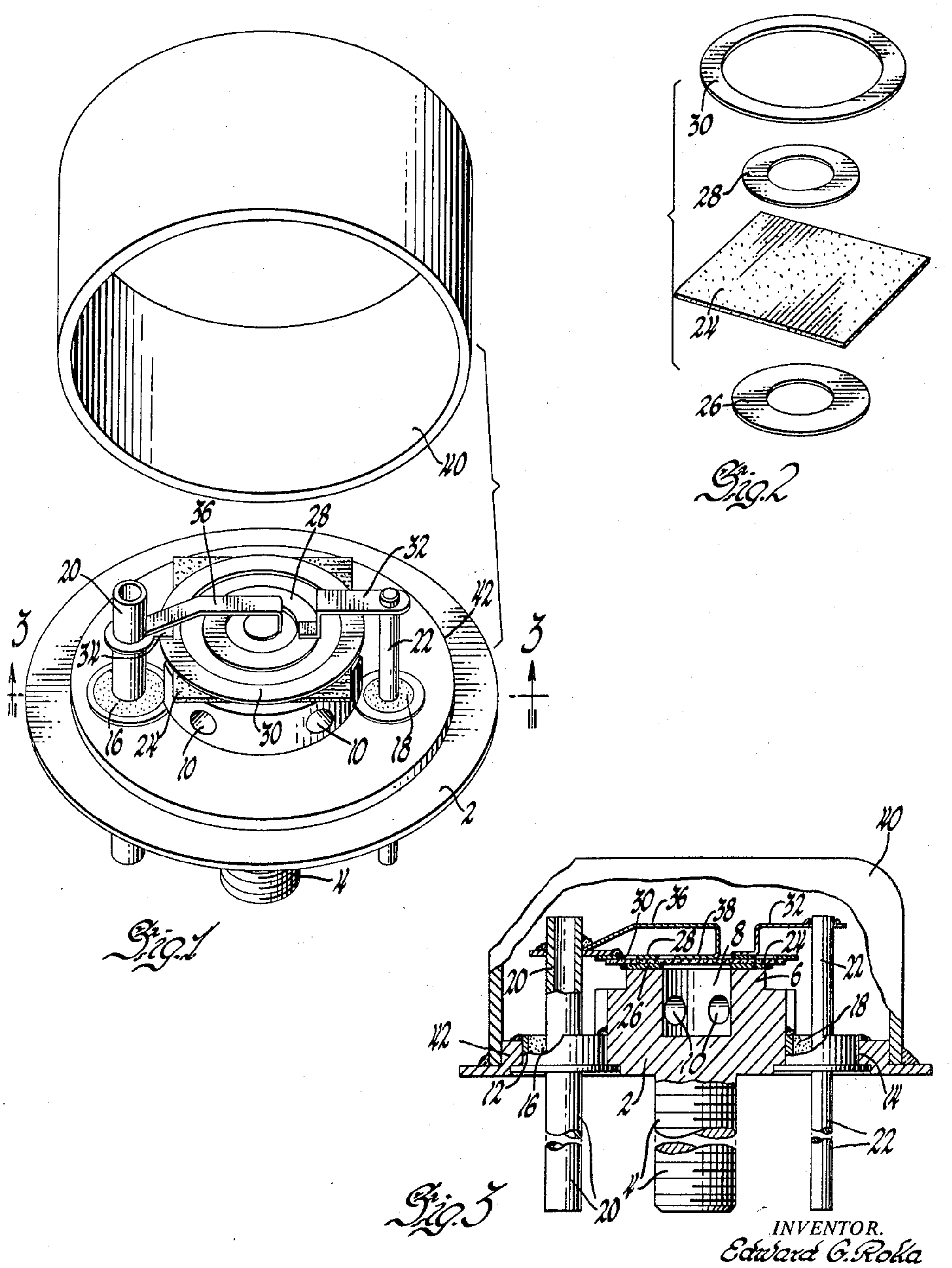

This invention relates to semi-conductor devices which are conventionally referred to as transistors and may be utilized in the same general manner as electron tubes to amplify electrical voltages and currents. They may consist of germanium or silicon base members to which electrodes are secured and alloyed to introduce different electrical characteristics. One particular advantage of the use of transistors in place of electron tubes is their very low power consumption with respect to that of an electron tube. Another advantage is their reliability. One difficulty, however, has been that those so far developed are not capable of carrying currents of any appreciable size with low distortion and high gain, and heretofore could be utilized only where small power requirements are involved or where gain and distortion are of secondary importance.

It is an object in making this invention to provide a semi-conductor device which is capable of handling relatively large amounts of power without sacrificing high gain and low distortion.

It is a further object in making this invention to provide a semi-conductor device which is especially adapted for use at low frequency, high power requirements.

It is a still further object in making this invention to provide a semi-conductor transistor construction which is of the alloyed junction type and relatively rugged and simple capable of handling comparatively large amounts of power.

These and other objects and the advantages of the invention will be best understood by specific reference to the following specification, claims, and the illustrations in the accompanying drawings in which, FIGURE 1 is an enlarged perspective view of the top of my transistor assembly with the cover removed and shown in spaced relation.

FIGURE 2 is an exploded view of the several parts of the transistor per se many times normal size, and FIGURE 3 is an enlarged side plan view of the completed transistor assembly with parts broken away and shown in section.

Referring now more particularly to the drawings, the transistor assembly consists of a main base or support 2 formed of high heat and electrically conductive material such, for example, as copper which is circular in shape and has a supporting threaded stud section 4 integral therewith and by which the assembly may be mounted. The base 2 also has a raised central portion 6 on the upper face upon which the transistor per se is mounted. This section has a hollow central portion 8 with a series of radial openings 10 extending from the outer surface into the central aperture 8. A pair of openings 12 and 14 is provided in the sides of the base disc and each supports a glass insulating grommet 16 and 18. An electrically conductive hollow tube 20 is supported in glass grommet 16 and a second conductive rod 22 is supported in the glass grommet 18, the axes of both of which are parallel to the major axis of the stud 4 and base 2. These members 20 and 18 provide electrical connections for the transistor to the outside of the casing after assembly. The tube 20 is hollow in order to provide for evacuation of the transistor area after the cap has been sealed on.

The transistor itself consists, of course, of a semi-conductor crystal or wafer 24 which has certain impurities introduced therein to give it either P or N characteristics. As an example, let it be assumed that in the present instance the wafer 24 is formed of germanium of an N-type. The transistor utilized in this instance is known as the alloyed junction type and consists of a semi-conductor crystal and a plurality of members of a material introducing a different electrical characteristic from that of the original crystal when alloyed thereto which provides diffusion boundaries for giving transistor action. In this instance, since it is assumed that the wafer or crystal has negative or N characteritsics, as exemplary only, let it be assumed that the two discs 26 and 28, which are to be alloyed to the opposite surfaces of the central crystal wafer 24, provide P-type characteristics in the diffusion area. These discs may be formed of indium and are in the form of flat stamped-out rings. They are applied to opposite surfaces of the germanium crystal and heated to alloy them firmly to the crystal and penetrate to form desired boundaries. While both rings are of the same average diameter, one ring 26 is wider radially than the other. The larger ring 26 will act as the collector electrode and the narrower ring 28, the emitter electrode.

In any transistor construction, there is also provided an ohmic connection to the base electrode. In this instance, the ohmic connection takes the form of a larger diameter ring 30 which is fixedly secured to the base or germanium crystal 24 concentric to and outside of the emitter electrode 28. It also may be alloyed to the surface and may consist of an alloy of cobalt and nickel such, for example, as that sold commercially as "Kovar." When the crystal and the rings 26, 28 and 30, as well as a further central ohmic connector 36 affixed to the center of the crystal, have all been assembled to form the transistor, the assembly is placed on top of the raised portion 6 of the supporting base 2 with the collector electrode 26 in contact with the upper surface of said base. The matching surfaces are of the same size. The transistor is attached permanently to said base by soldering the collector ring 26 to the upper face of the portion 6. The copper supporting base 2 therefore becomes the collector electrode of the transistor. This acts to efficiently conduct heat away from the crystal assembly.

Since semi-conductive material is expensive, it is desired to maintain the size of the transistor small from a cost standpoint. The necessary size and geometry of the emitter and collector rings determine, of course, the size of the crystal. As exemplary of a set of dimensions which I have used and found particularly satisfactory are the following:

Crystal: .300" x .300" x .006"
Emitter ring: .0095 thickness, .135 inner diameter, .205 outer diameter.
Collector ring: .0095 thickness, .110 inner diameter, .230 outer diameter.

The emitter ring 28 mounted on the upper surface of the transistor assembly is electrically connected directly to the terminal rod 22 by a short connecting member 32 which is soldered to both. The base or ohmic connection for the transistor, in other words, the connection to the crystal itself is provided through the alloy ring 30 and central terminal 36. The ring 30 is electrically connected to the hollow terminal tube 20 by a short electrically conductive member 34 which slips over the end of the tube 20 and rests upon the upper surface of the ring 30 and which is soldered to both. A second ohmic connection to the crystal wafer 24 is through member 36 which is soldered to the tube 20 to which it extends.

When the transistor has been fabricated and then secured to the base 2 and connected to the rod and tube 22 and 20, respectively, the cover 40 is dropped over the assembly and fits snugly around the raised portion 42. This surface is tinned with solder previous to the application of the cap, and when the cap is put in place, this surface is heated to solder and to firmly secure the cap in place and at the same time seal the assembly from atmosphere. When this has been sealed, an evacuating pump is connected to the tube 20 and the assembly evacuated to a desired amount and refilled, if wanted. When that point is reached, the lower end of the tube 20 is pinched off and sealed to maintain the transistor area hermetically enclosed in a vacuum or under a controlled atmosphere.

I claim:

1. In a transistor assembly, a sheet of germanium having indium rings alloyed to the opposite faces thereof, a supporting base of electrically conductive material having a raised hollow central portion having radial openings therethrough and with an upper surface of the same configuration and area as one of the rings, means for securing said one ring to said upper surface, a plurality of conductive terminals insulatably mounted in the base, and conductive means connecting the terminals with the sheet and another of said rings, said supporting base forming an electrical connection to said one ring.

2. In a transistor assembly, a sheet of germanium having opposite plane faces and indium rings alloyed to said faces thereof, a supporting base having a raised hollow central portion having radial openings therethrough and with an upper surface of substantially the same configuration as one of the rings, means for securing the one ring and the sheet to said upper surface of the supporting base, a plurality of conductive terminals insulatably mounted in sealed relation in said base, one of said terminals being hollow, conductive means connecting said terminals to the sheet and upper ring to complete connections to the transistor, and a cap sealed over the base to totally enclose said transistor, said hollow terminal providing an exit for evacuating the housing formed by the base and cap which can then be pinched off for sealing.

3. In a transistor assembly, a flat sheet of germanium having a pair of opposite plane faces, a pair of indium rings alloyed to said opposite faces of said sheet; a supporting base structure having high heat conductivity and electrical conductivity and having a mounting surface of large area adjacent one of said rings for mounting said sheet and said rings, a pair of terminals insulatably supported in said supporting structure, a ring of ohmic material coaxial with said rings and mounted on the face of said sheet opposite said supporting base, a conductive connection from said ohmic ring to one of said terminals, a strip of ohmic material connected to said one terminal and the central portion of the face of said sheet opposite said supporting base, and a conductive connection from the other of said rings to the other of said terminals, said supporting base structure providing still another terminal for said transistor assembly.

References Cited by the Examiner

UNITED STATES PATENTS

| | | | |
|---|---|---|---|
| 2,563,503 | 8/51 | Wallace | 317—235 |
| 2,644,852 | 7/53 | Dunlap | 317—239 |
| 2,703,855 | 3/55 | Koch et al. | 317—235 |
| 2,725,505 | 11/55 | Webster | 317—235 |
| 2,742,383 | 4/56 | Barnes et al. | 317—235 |
| 2,754,455 | 7/56 | Pankove | 317—234 |

DAVID J. GALVIN, *Primary Examiner.*

SAMUEL BERNSTEIN, LLOYD McCOLLUM, GEORGE N. WESTBY, ARTHUR GAUSS, BENNETT G. MILLER, *Examiners.*